United States Patent
Liu et al.

(10) Patent No.: US 9,021,771 B2
(45) Date of Patent: May 5, 2015

(54) HEAT SEALER WITH ALGORITHM FOR REGULATING SEALING TEMPERATURE

(75) Inventors: Zhu Liu, Dongguan (CN); Terry Sun, Dongguan (CN); Francis Wong, Dongguan (CN); Landen Higer, Alameda, CA (US)

(73) Assignee: Sunbeam Products, Inc., Boca Raton, FL (US)

( * ) Notice: Subject to any disclaimer, the term of this patent is extended or adjusted under 35 U.S.C. 154(b) by 167 days.

(21) Appl. No.: 12/953,637

(22) Filed: Nov. 24, 2010

(65) Prior Publication Data

US 2012/0060447 A1  Mar. 15, 2012

Related U.S. Application Data

(63) Continuation-in-part of application No. 10/897,327, filed on Jul. 21, 2004, now abandoned.

(60) Provisional application No. 60/491,876, filed on Jul. 31, 2003.

(51) Int. Cl.
| | |
|---|---|
| B65B 31/00 | (2006.01) |
| B65B 57/18 | (2006.01) |
| B65B 51/10 | (2006.01) |
| B29C 65/22 | (2006.01) |
| B29C 65/00 | (2006.01) |
| B65B 31/04 | (2006.01) |
| B65B 51/14 | (2006.01) |

(52) U.S. Cl.
CPC .............. *B65B 57/18* (2013.01); *B29C 65/223* (2013.01); *B29C 65/224* (2013.01); *B29C 66/1122* (2013.01); *B29C 66/232* (2013.01); *B29C 66/43121* (2013.01); *B29C 66/7373* (2013.01); CPC . *B29C 66/8324* (2013.01); *B29C 66/8491* (2013.01); *B29C 66/8748* (2013.01); *B29C 66/9121* (2013.01); *B29C 66/91231* (2013.01); *B29C 66/91423* (2013.01); *B29C 66/919* (2013.01); *B29C 66/949* (2013.01); *B65B 31/048* (2013.01); *B65B 51/146* (2013.01); *B65B 31/00* (2013.01); *B29C 66/91211* (2013.01); *B29C 66/91421* (2013.01); *B29C 66/91431* (2013.01); *B29C 66/91641* (2013.01); *B29C 66/91655* (2013.01); *B29C 66/91445* (2013.01); *B29C 66/91935* (2013.01); *B29C 66/961* (2013.01)

(58) Field of Classification Search
CPC ........ B65B 31/00; B65B 31/02; B65B 57/00; B65B 57/18; B65B 51/00; B29C 65/224; B29C 66/232; B29C 66/1122; B29C 66/43121; B29C 66/8491; B29C 66/9121; B29C 66/91423; B29C 66/949; B29C 66/91231; B29C 66/919; B29C 66/91211; B29C 66/91935; B29C 66/91445; B29C 66/91655; B29C 66/91641
USPC ........... 53/405, 408, 432, 434, 477, 479, 469, 53/52, 56, 57, 58, 503, 86, 512, 302, 507, 53/370.7
See application file for complete search history.

(56) References Cited

U.S. PATENT DOCUMENTS

| | | |
|---|---|---|
| 5,321,230 A | 6/1994 | Shanklin et al. |
| 5,551,213 A | 9/1996 | Koelsch et al. |

(Continued)

FOREIGN PATENT DOCUMENTS

KR     10-0546042     1/2006

*Primary Examiner* — Thanh Truong
*Assistant Examiner* — Justin Citrin
(74) *Attorney, Agent, or Firm* — Michael J. Corrigan

(57) ABSTRACT

A vacuum and sealing appliance comprises a heat sealing element for sealing a container during a sealing cycle. A controller controls the temperature of the heat sealing element during the sealing cycle based on a signal from a temperature sensor that senses the real-time temperature of the heat sealing element. A seal indicator light is provided which is lighted during the sealing cycle and extinguished at its completion. The signal from the controller energizes the heating element for a time to heat the sealing element to a predetermined temperature for sealing the container and initiates a dwell time corresponding to cooling the heating element after sealing the container. Values of the real-time temperatures of the heat sealing element and values of the sealing times and the dwell times that correspond to the values of the real-time temperatures of the heat sealing element are stored in a look-up table.

21 Claims, 23 Drawing Sheets

(56) References Cited

U.S. PATENT DOCUMENTS

| | | | |
|---|---|---|---|
| 5,561,964 A | 10/1996 | McIntyre et al. | |
| 5,597,499 A | 1/1997 | Dunn | |
| 5,893,822 A * | 4/1999 | Deni et al. | 53/512 |
| 6,125,613 A * | 10/2000 | Eberhardt et al. | 53/432 |
| 6,256,968 B1 * | 7/2001 | Kristen | 53/512 |
| 6,719,863 B2 | 4/2004 | Basque | |
| 7,207,160 B2 | 4/2007 | Baptista | |
| 7,302,784 B2 | 12/2007 | Harges et al. | |
| 7,411,162 B2 | 8/2008 | Kalinowski et al. | |
| 2004/0060262 A1 * | 4/2004 | Harges et al. | 53/434 |
| 2005/0022474 A1 | 2/2005 | Albritton et al. | |
| 2007/0113523 A1 | 5/2007 | Baptista | |

* cited by examiner

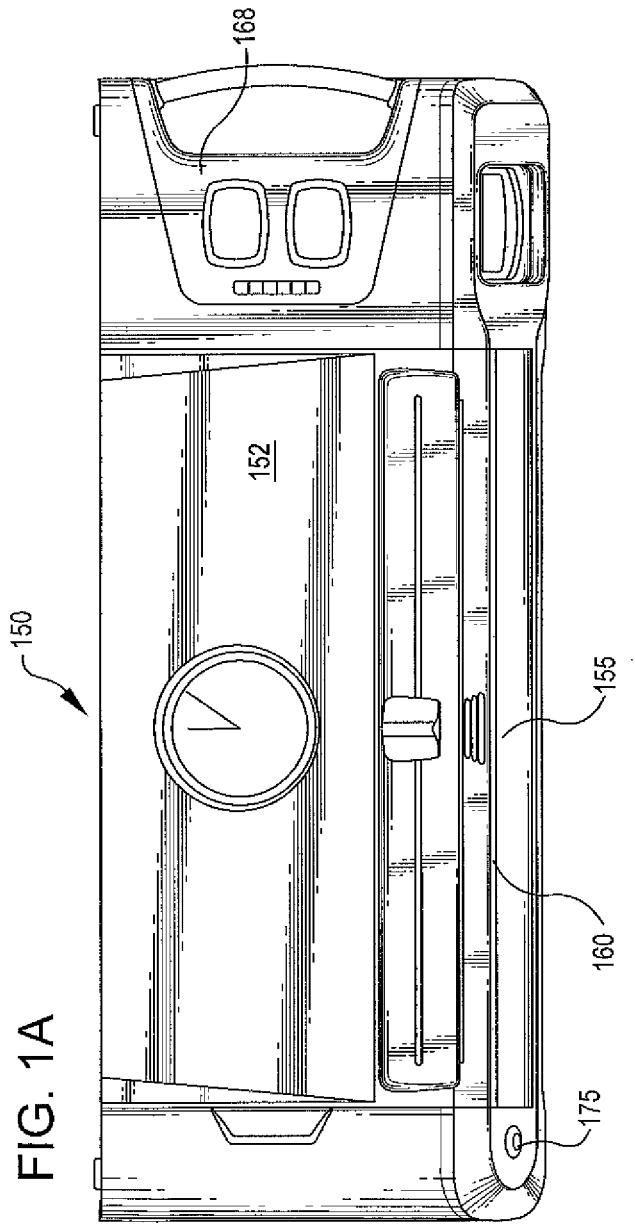

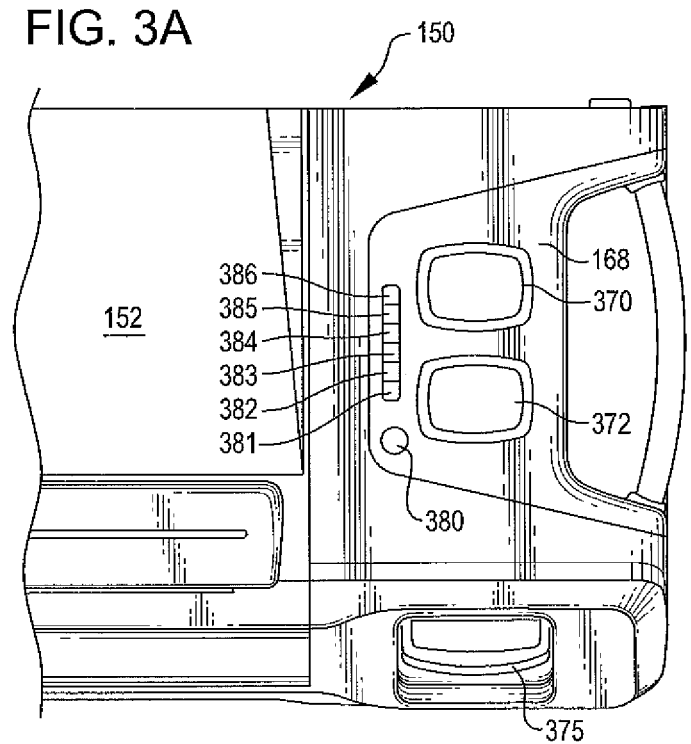

US 9,021,771 B2

HEAT SEALER WITH ALGORITHM FOR REGULATING SEALING TEMPERATURE

RELATED APPLICATION

This is a non-provisional continuation-in-part application of non-provisional application Ser. No. 10/897,327 filed on Jul. 21, 2004 now abandoned, the contents of which are incorporated herein by reference and the priority benefit of which is hereby claimed, which claims the benefit of provisional patent application No. 60/491,876 filed on Jul. 31, 2003, entitled HEAT SEALING ELEMENT AND CONTROL OF SAME.

FIELD OF THE INVENTION

The invention relates to a heat sealer, and more particularly to, a heat sealer utilizing an algorithm to regulate the sealing temperature.

BACKGROUND OF THE INVENTION

Presently, various appliances and methods are used for the purpose of vacuum sealing plastic bags and containers to protect perishables, such as foodstuffs, and other products against oxidation. Conventional commercial appliances and some consumer appliances are generally expensive to manufacture, complex in construction and/or cumbersome to operate. There are also different types of heat sealing mechanisms contained in these prior art devices that have limited success in hermetically sealing the evacuated bags.

One type of conventional vacuum sealing appliances uses a vacuum nozzle that is inserted within a plastic bag for evacuation purposes. Although adaptable for low-volume home use, this type of system is cumbersome to use and normally requires a liquid separator or filter to prevent liquids or powders, retained within the bag, from being drawn into a vacuum pump connected to the nozzle. Further, a heat sealer employed therein must be closely synchronized with the positioning and withdrawal of the vacuum nozzle from the bag. This greatly adds to the cost and complexity of the device itself.

U.S. Pat. No. 3,928,938 discloses another type of vacuum sealing appliance that employs a heat sealing mechanism. In this appliance a user places a portion of a bag, containing a product to be packaged, in a first vacuum chamber and extends an open end or neck of the bag into a second vacuum chamber. The first vacuum chamber is then evacuated to expand the neck of the bag to isolate the chambers from each other. Then a vacuum is drawn in the second vacuum chamber to evacuate the bag. Thus, isolation of the two chambers from each other, during evacuation of the second vacuum chamber, is dependent on the physical properties composing the neck of the bag and very close synchronization and calibration of the evacuation and sealing procedures and controls therefore. This complex process in conjunction with the heat sealing mechanism is not reliable.

These prior art appliances described above and others require the use of special bags that must be purchased from the manufacturer. Due to the cost of the vacuum useable bags, it is desirable to conserve the material as much as possible. One problem with the above appliances is that there is a substantial amount of wasted vacuum bag material between the end of the bag and the heat seal as shown in Prior Art FIG. 12. FIG. 12 shows a container 20, with heat seals 21 and 22. For example, the vacuum sealed container 20 of FIG. 12 may be approximately 10 inches in length. The length between the end of the container 20 and each heat seal (21 and 22) is approximately an inch and a half. Therefore 3 inches of bag material is essentially unused for a 10 inch vacuum sealed bag. Therefore prior art devices waste approximately 30% of the vacuum bag material per use.

Another problem with prior art vacuum packaging appliances is that the temperature of the heat sealing mechanism is not accurately controlled. This is because the prior art appliances use a simple on/off time switch to excite the heat sealing elements. Under the heat seal control mechanism of the prior art, sealing multiple bags without allowing the heat sealing element to cool results in bags beginning to seal before the vacuum process is complete. This causes ineffective seals and prevents complete evacuation of gas from the bags, that results in expensive packaging bag waste. Further, activating the elements without considering real-time temperature may cause damage to the appliance due to element overheating.

Therefore there exists a need for a vacuum packaging appliance that accurately controls the temperature of the heat sealing elements and optimizes the placement of the heat sealing elements within the appliance.

SUMMARY OF THE INVENTION

In an embodiment, there is provided a method of controlling a sealing appliance, comprising sensing with a sensor a first temperature of at least one heat sealing element, determining an actuation control signal based on the first temperature for use during a sealing operation cycle, the sealing operation cycle including at least a sealing time corresponding to energizing and heating the at least one heat sealing element to a pre-determined temperature for sealing a container and a dwell time corresponding to cooling of the at least one heating element after sealing the container, and extinguishing a seal indicator light when the sealing operation cycle is complete, whereby values of the first temperatures of the at least one sealing element and values of the sealing times and the dwell times that correspond to the values of the first temperatures are stored in a look-up table.

In another embodiment, there is provided a vacuum and sealing appliance comprising a least one heat sealing element for sealing a vacuum packaging container placed in the vacuum and sealing appliance during at least one sealing cycle, a temperature sensor for sensing a first temperature of the at least one sealing element prior to the beginning of the at least one sealing cycle, a heat sealing element controller that controls the temperature of the at least one heat sealing element during the at least one sealing cycle based on a signal from the temperature sensor, a seal indicator light which is lighted during the at least one sealing cycle and extinguished at the completion of the at least one sealing cycle, wherein the signal from the controller energizes the heating element for a first time to heat the at least one heat sealing element to a pre-determined temperature for sealing the vacuum packaging container and a dwell time corresponding to cooling of the at least one heating element after sealing the vacuum packaging container, and values of the first temperatures of the at least one heat sealing element and values of the sealing times and the dwell times that correspond to the values of the first temperatures are stored in a look-up table.

In another embodiment, there is provided a method of controlling a sealing appliance, comprising sensing with a first sensor a first temperature of at least one heat sealing element, sensing with a second sensor a second temperature of a base of the sealing appliance, determining whether the first temperature of the at least one heat sealing element is below a first threshold temperature and whether the second temperature of the base is below a second threshold temperature, disabling all vacuum and sealing operation keys if both the first temperature of the at least one heat sealing element is not below the first threshold temperature and the second temperature of the base is not below a second threshold temperature and flashing a seal indicator light, initiating a sealing operation cycle if both the first temperature of the at least one heat sealing element is below the first threshold temperature and the second temperature of the base is below a second threshold temperature and lighting the seal indicator light. The sealing operation cycle includes: determining an actuation control signal based on the sensed first temperature of the heat sealing element for use during the sealing operation cycle, the sealing operation cycle including at least a sealing time corresponding to energizing and heating the at least one heat sealing element to a pre-determined temperature for sealing a container and a dwell time corresponding to cooling of the at least one heating element after sealing the container, and extinguishing the seal indicator light when the sealing operation cycle is complete, whereby values of the initial temperatures of the at least one sealing element and values of the sealing times and the dwell times that correspond to the values of the initial temperatures are stored in a look-up table.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 1A is an isometric view of an alternate embodiment of the vacuum packaging apparatus of the invention with the lid in a closed position.

FIG. 3A is an isometric view of the control panel of the apparatus shown in FIGS. 1A and 2A.

DETAILED DESCRIPTION OF THE INVENTION

The present invention sets forth several embodiments relating to the position and control of heat sealing elements within vacuum packaging appliances.

The heat sealing element may be mounted on the lid or the base of the appliance. The placement of the heat sealing element within the appliance minimizes wasted bag material, as the heat seal is placed closer to the end of the bag itself. The present invention also includes a heat sealing controller that may adjust the amount of current applied to the heat sealing element based on a number of different inputs. It will be understood by those skilled in the art that the description of the methods and structures of the vacuum packaging appliance described below is not intended to be limiting in anyway.

Figure 1:
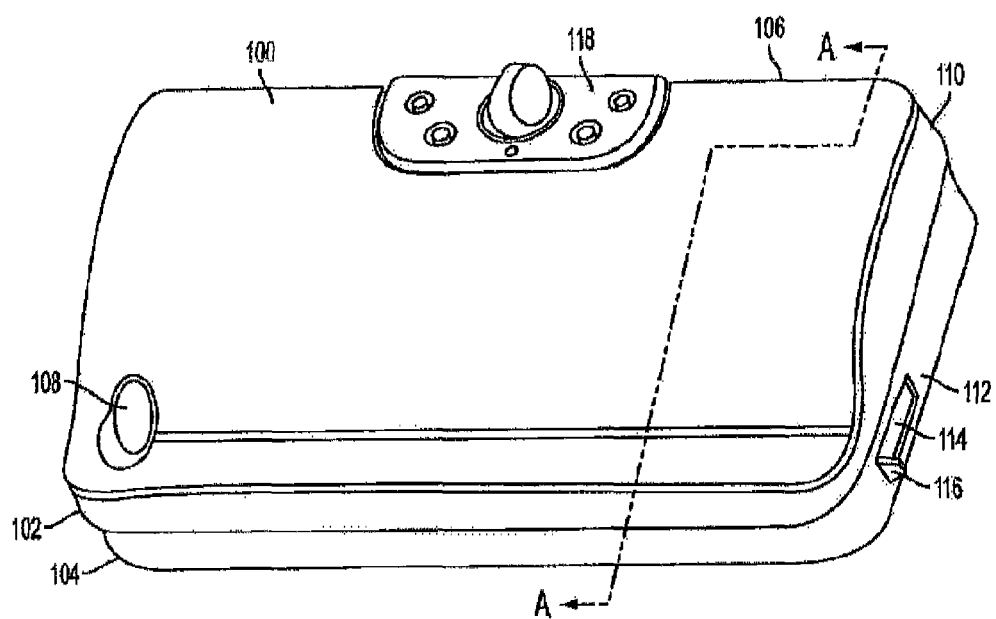
FIG. 1 is an isometric view of one embodiment of the vacuum packaging apparatus of the invention with the lid in a closed position.

FIG. 1 shows a vacuum packaging appliance 100 for vacuum packaging articles in a container. The vacuum packaging appliance 100 has a lid 102 and a base 104 that are pivotally connected at a back side 106 of the appliance 100. The lid includes a blade handle 108 that is associated with a blade (not shown) that is slideably engaged within a slot 110 that extends substantially the entire length of the vacuum packaging appliance 100. The blade is for cutting sections of flexible vacuum bag material that may be stored inside the appliance 100.

FIG. 1 also shows that the base 104 of the vacuum packaging appliance 100 includes an aperture 112 that is covered by a door 114. The door 114 is slideably mounted in the interior of the base 104 and includes a protrusion 116 that allows a used to more easily slide the door 114 between an open and closed position. A trough for collecting debris may be placed into the appliance 100 through this door 114. A control panel 118 is coupled with the base 104 and extends above the lid 102. As will be described with reference to FIGS. 3 and 9, the control panel 118 provides and allows operator input to control the heat sealing process of the vacuum packaging appliance 100.

Figure 9:
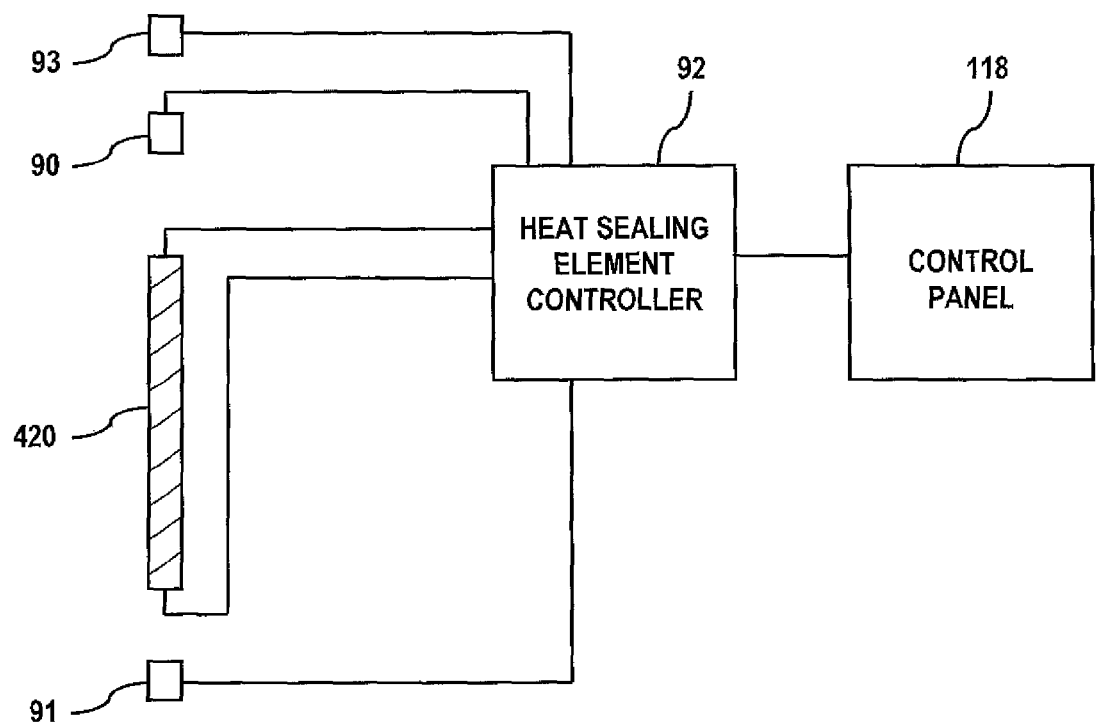
FIG. 9 is schematic diagram of the control circuitry of the heat sealing element.

FIG. 1A shows an alternate embodiment of a vacuum packaging appliance 150 similar to the vacuum packaging appliance 100 above. A control panel 168 is disposed on a base 155 adjacent the lid 152. A lid 152 is pivotally mounted to the base 155 at the backside of the appliance 150. As will be described with reference to FIGS. 3A and 9, the control panel 168 provides and allows operator input to control the heat sealing process of the vacuum packaging appliance 150. There is a slot 160 between the lid 152 and the base 155 where a container 20 may be inserted for sealing by heating elements 420 controlled by a controller 92 (FIG. 9). There is also a port 175 for attaching a tube for evacuating an external container (not shown).

Figure 2:
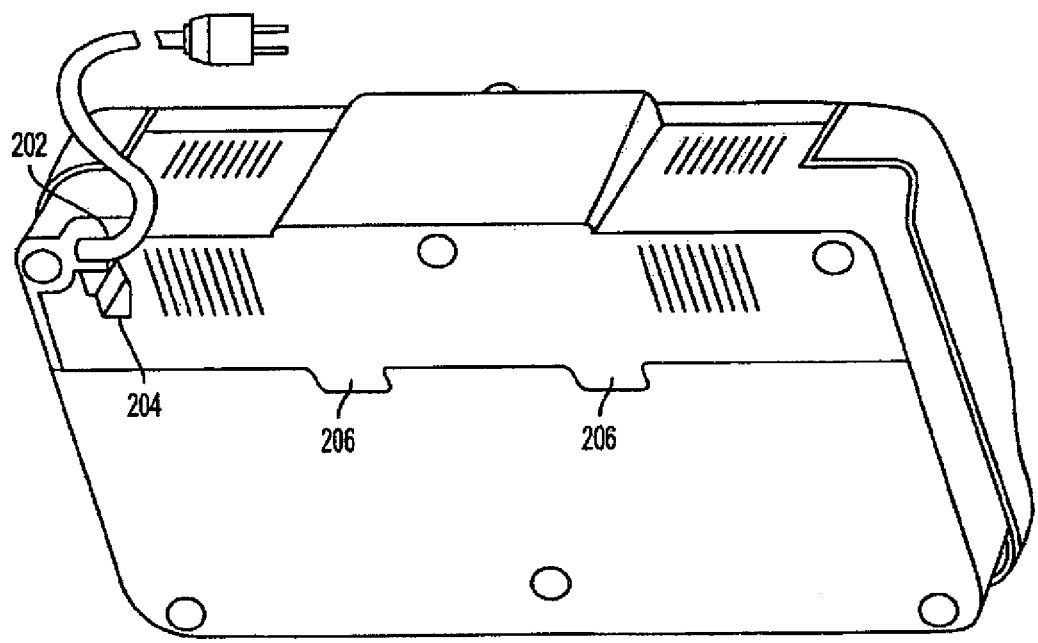
FIG. 2 is an isometric view of the underside of the apparatus shown in FIG. 1.

FIG. 2 is an isometric view of the underside of the vacuum packaging appliance 100. The vacuum packaging appliance 100 includes an alternating current (AC) power cord 202 that is coupled with the base 104. The base 104 also has a recess 204 for storage of the power cord 202. To at least partially retain the power cord in the recess 204, the base also includes cord retention flanges 206. In the embodiment shown in FIG. 2, the power cord 202 will supply electrical power to the heating elements and the vacuum pump of the vacuum packaging appliance 100.

Figure 2A:
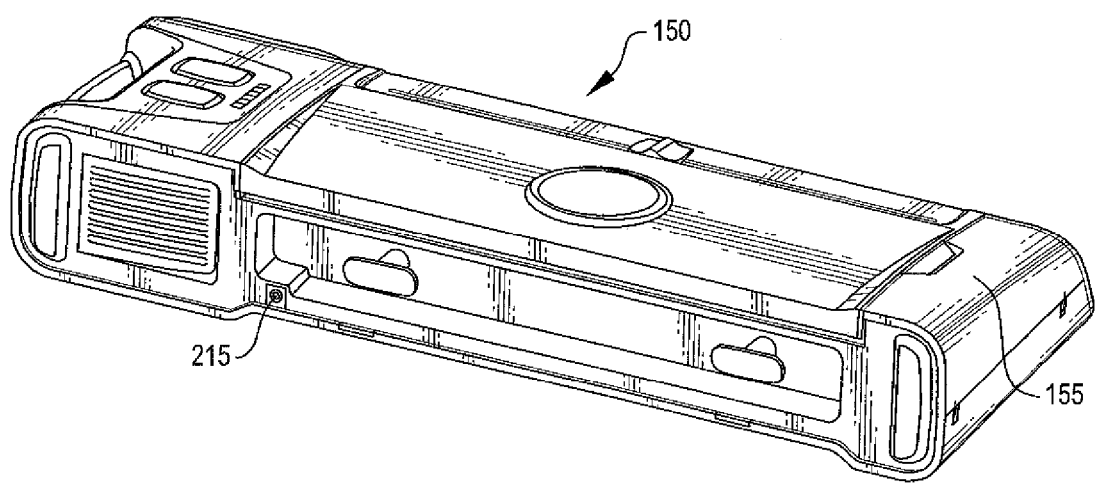
FIG. 2A is an isometric view of the rear of the apparatus shown in FIG. 1A.
Figure 2B:
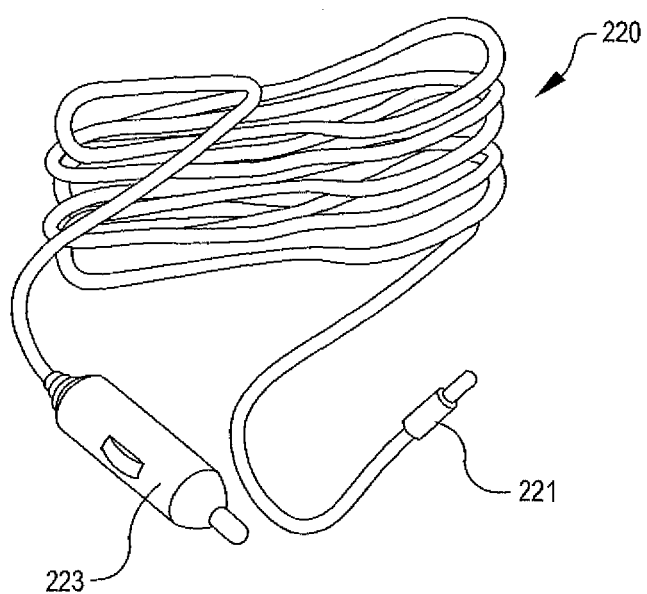
FIG. 2B is an isometric view of a DC power adapter for use with the apparatus shown in FIGS. 1A and 2A.

Optionally, in the alternate embodiment of the vacuum packaging appliance 150 shown in FIG. 2A, in addition to an alternating current (AC) power cord 202 (not shown) a direct current (DC) power cord 220 (FIG. 2B) may be provided to supply electrical power to the heating elements and the vacuum pump of the vacuum packaging appliance 150. The power cord 220 includes a plug 221 on a first end that plugs into an outlet 215 (FIG. 2A) disposed in the base 155. A second end of the power cord 220 connects to a source of DC power such as a 12 volt cigarette lighter outlet in an automobile. The power cord 220 may include on the second end a cigarette lighter adapter 223 that plugs into the cigarette lighter outlet in the automobile.

Figure 3:
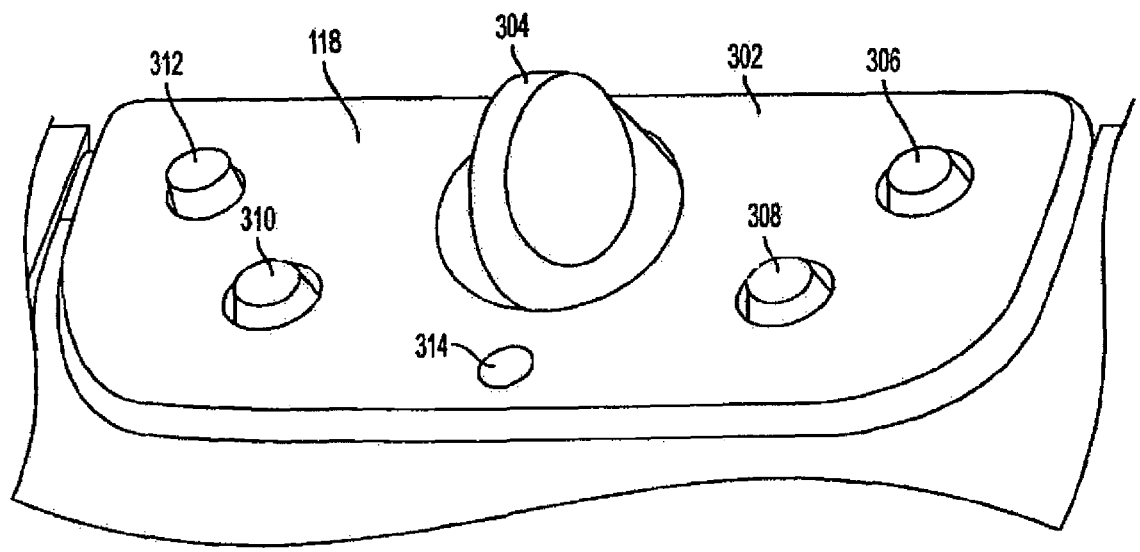
FIG. 3 is an expanded isometric view of the control panel of the apparatus shown in FIG. 1.

FIG. 3 is a magnified view of the control panel shown in FIG. 1. The control panel 118 has a face plate 302 that is removably coupled with the base 104. The control panel 118 has a rotary dial 304, a cancel control button 306, an instant seal button 308, an extended vacuum control button 310, an accessory port 312 and an indicator light 314. In alternate embodiments, various other controls maybe included in the control panel 118 and/or various controls maybe excluded from the control panel 118.

The rotary dial 304 has multiple positions that can control various aspects of the vacuum packaging appliance 100, for example: "Accessory", 1, 2, 3 and "Seal Only". However in other embodiments, the rotary dial may have more or fewer settings that can control various aspects of the vacuum packaging appliance 100. When the rotary dial 304 is in the accessory position, the accessory port 312 is activated and accessories (not shown) can be attached to the vacuum packaging appliance 100 either directly or via a vacuum hose. When the rotary dial 304 is in any position other than the accessory position, the accessory port 312 is sealed off and a vacuum is not drawn through the accessory port 312.

Positions 1, 2 and 3 of the rotary dial 304 allow the user to control the duration of the evacuation process and the length of time the heat sealing element is activated. Position 1 may activate the sealing mechanism for a first predetermined period producing a light seal. Position 2 may activate the sealing mechanism for a second predetermined period producing a medium heat seal, and position 3 may activate the sealing mechanism for a third predetermined period resulting in a heavy heat seal. Position 1 would correspond to a fragile content mode, wherein an actuation control signal would have a sealing time period shorter than a normal content mode sealing time period. Thus, the user can select the duration of the sealing process. For example sealing potato chips or fruit may require a fragile or light seal; whereas sealing meat would require a heavy seal. The seal only position allows a user to use the apparatus to operate a sealing mechanism only, without requiring evacuation of a primary evacuation chamber.

Although the apparatus shown in FIG. 3 includes a rotary dial 304 with five positions, in alternate embodiments the apparatus can include a rotary dial 304 that has more or fewer positions. For example a "smart seal" setting may be included. When the "smart seal" is selected the appliance automatically controls the current to the heat sealing elements in accordance with the actual element temperature. After repetitive uses the heat sealing elements may become hot; therefore it requires less electrical power to heat the sealing elements to a sealing temperature. The control of the heat sealing elements is described below with reference to FIG. 9.

The cancel button 306 allows a user to cancel a vacuum operation or sealing operation at any time during the operation. The instant seal button 308 allows a user to terminate the evacuation process and begin the sealing process at any time during operation of the vacuum packaging appliance 100. The extended vacuum button 310 allows a user to extend the length of time for which the container (not shown) is evacuated. The accessory port 312 allows a user to connect the apparatus to various containers as described in U.S. Pat. No. 4,491,310, by Hanns J. Kristen, issued Jul. 17, 1990, and assigned to the same assignee as this patent application, the complete contents of which is incorporated herein by reference.

The indicator light 314 serves to notify a user of the status of the vacuum packaging appliance 100. In the embodiment shown in FIG. 3, the indicator light is off when the device is inactive, solid green while the device is actively evacuating a container and emits intermittent green flashes when the device is sealing a container. However, in alternate embodiment the light may emit light of various colors and/or intensities and/or at various intervals to indicate various operations that the machine is performing. For example, the indicator light 314 may flash amber or some other color to indicate that the device is currently drawing an extended vacuum or the indicator light 314 may glow red to indicate that the accessory port 312 is active. In still further alternate embodiments, the control panel 118 may not include an indicator light 314.

In the alternate embodiment of the vacuum packaging appliance 150 shown in FIG. 3A, the rotary dial 304 has been replaced with a single seal button 370 similar to the "smart seal" button above for controlling the current to the heat sealing elements. There is also a seal and vacuum button 372 and a plurality of indicator lights 381-385 which may be light emitting diodes (L.E.D.'s). The indicator lights 381-385 emit a solid green light to indicate the progress of the vacuum operations. A lever 375 is provided which is moveable between a first open position to a second position to latch the lid 150 closed to perform the vacuum and sealing operations. A ready indicator light 380 is provided to indicate that the lid 150 is latched in the closed position. The ready indicator light 380 emits a solid green light to indicate that the appliance 150 is ready to perform vacuum and sealing operations. A seal indicator light 386 indicates when the sealing operation is being performed on the container 20 by emitting a steady red light which is extinguished when the sealing operations are completed and the sealed container 20 may be removed from the appliance 150. The control of the heat sealing elements is described below with reference to FIG. 9.

Figure 4:
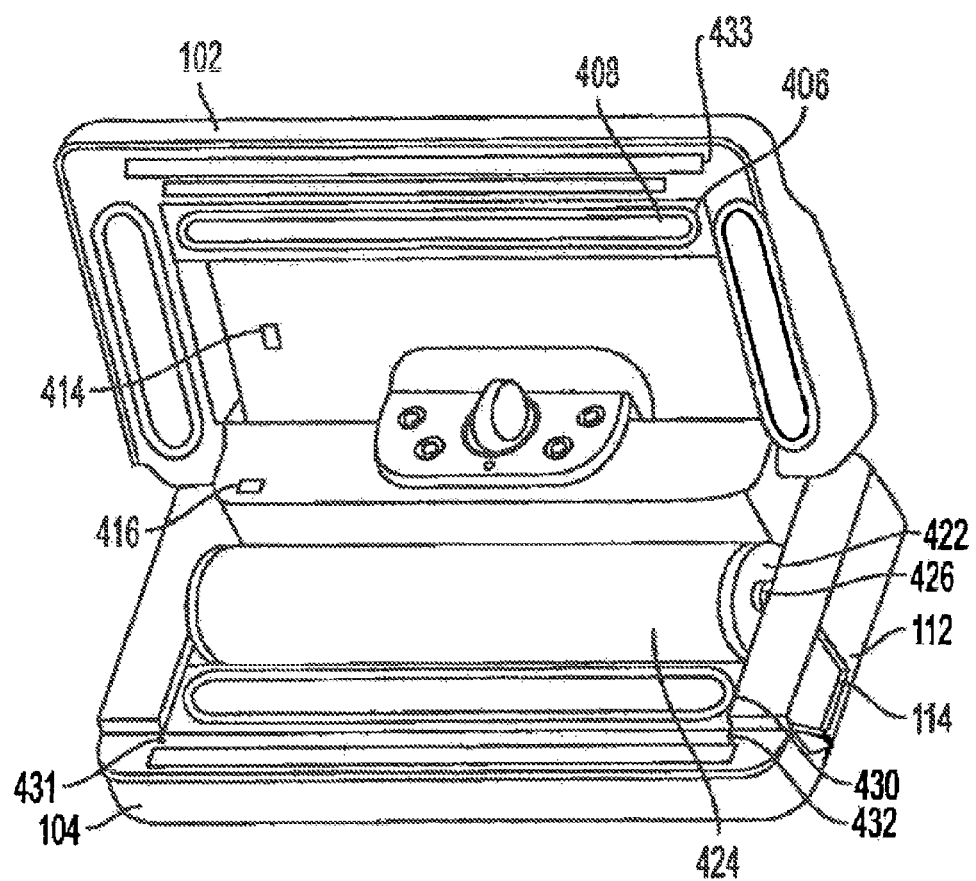
FIG. 4 is an isometric view of the apparatus shown in FIG. 1 with the lid in an open position.

FIG. 4 is an isometric view of the apparatus 100 shown in FIG. 1 with the lid 102 in an open position. The lid 102 includes a primary evacuation chamber 408 that is surrounded by a flexible gasket 406. The primary evacuation chamber 408 is coupled to a vacuum source housed inside the vacuum packaging appliance 100. The lid also includes a heat sealing element 433. The heat sealing element 433 touches electrical contacts 431 and 432 on the base of the device when the lid is closed. In this manner power is supplied to the heat sealing element via the contacts. This is desirable, as no power cord is necessary to run through the device hinges into the lid 102. This reduces the complexity of the device itself In alternate embodiments, the heat sealing element may be 2 wires or a wider element to ensure a proper heat seal.

The base 104 of the vacuum packaging appliance 100 includes an electromechanical switch 416, positioned on the base such that when the lid 102 is in a closed position, the protrusion 414 is substantially vertically aligned with the electromechanical switch 416. Thus, when the lid 102 is in a closed position and then is further depressed, the protrusion 414 can actuate the electromechanical switch 416 and activate the vacuum packaging appliance 100.

The base 104 of the vacuum packaging appliance 100 shown in FIG. 4 has a recess 422 that is adapted to hold container material 424. The vacuum packaging container material 424 is a roll of flattened, tubular container material and is supported on rotational supports 426. The rotation supports 426 are designed to engage the ends of the roll of container material 424 and rotate freely within the recess 422. In a further embodiment, the roll or container material 424 may simply be place or stored in the recess 422 without any support mechanism to facility dispensing the container material 424.

The roll of container material may be a single roll of continuously bonded plastic as described in U.S. Pat. No. RE34,929, by Hanns J. Kristen, issued May 9, 1995 a reissue patent based on U.S. Pat. No. 4,756,422, by Hanns J. Kristen, issued Jul. 12, 1988, assigned to the assignee of the present application, the complete contents of which is incorporated herein by reference. However, in alternate embodiments, the roll of container material 424 may be any convenient material.

The thermal sealing mechanism 433 includes one or more electrically conductive wires that produce heat when a voltage differential is applied across the length of the wire. In the embodiment shown, the electrically conductive wires are covered with a Teflon tape. However, in alternate embodiments, the wires maybe exposed or wrapped in a material. If the sealing mechanism 433 is activated and container material 424 is disposed between the sealing gasket 406 and the sealing mechanism 433, the container material 424 can be hermetically sealed. Although the apparatus 100 is described as including a sealing mechanism 433 that is integrated with the apparatus, in alternate embodiments, the sealing mechanism 433 may be on the base of the device while the electrical contacts are located on the lid. Additionally in alternate embodiments, various other placements of the heat sealing mechanisms 433 may be employed in order to seal the container material 424.

In operation, when the lid 102 is in a closed position and is depressed such that the protrusion 414 actuates the electromechanical switch 416, the vacuum pump or source is activated. Evacuation of the primary evacuation chamber 408 and trough 430 is then performed. When the lid 102 is in a closed position, the gasket 406 surrounding the primary evacuation chamber 408 and the trough 430 are substantially vertically aligned such that a vacuum circuit is obtained or formed.

For cleaning purposes, the trough 430 is removable from the base 104 of the vacuum packaging appliance 100 through the aperture 112 when the door 114 is in an open position. In the embodiment shown in FIG. 4 the door 114 is manually slideable between and open and a closed position. However, in alternate embodiments, the door can be mechanically operated and/or can open in any convenient fashion. In still further alternate embodiments, the door 114 may not be present.

In operation, a user inserts an open end of a container 20, such as a flexible bag, into the trough 430 or attaches a container to the accessory port 312. The user then selects a setting on the rotary dial 304, closes the lid 102 and depresses the lid 102 past the closed position to actuate the electromechanical switch 416 with the protrusion 414. The vacuum source 434 (FIG. 7) will then evacuate the latch chambers (not shown) to held the lid 102 relative to the base 104. Once the lid 102 is secured relative to the base 104, the primary evacuation chamber 408 and the trough 430 are evacuated thus evacuating the open container inserted into the appliance 100. When the vacuum strength reaches a predetermined level, the sealing mechanism 433 will be activated to seal the container. The evacuated and sealed container may then be released from the vacuum packaging appliance 100.

Figure 5:
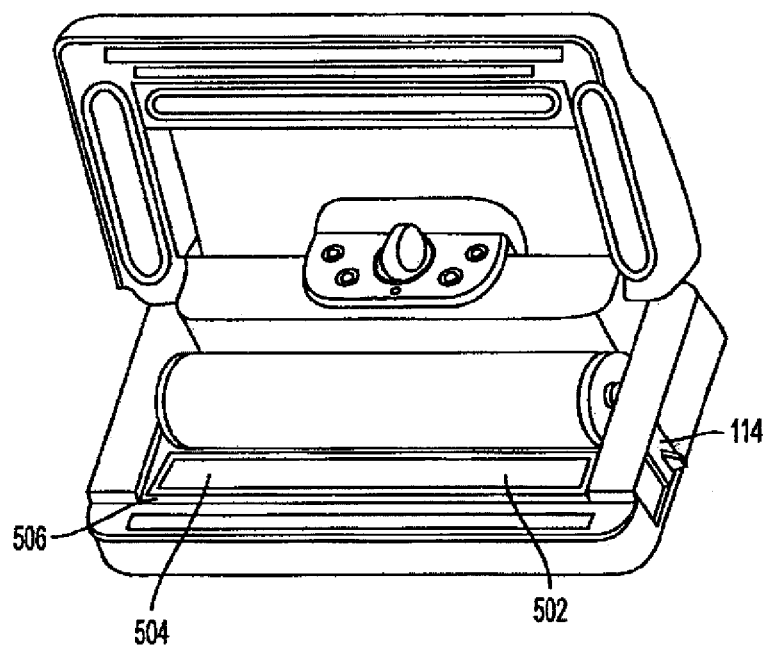
FIG. 5 is an isometric view of the apparatus shown in FIG. 1 with the lid in an open position and with the trough removed from the apparatus.

FIG. 5 is an isometric view of the apparatus shown in FIG. 4 with the trough 430 removed and the door 114 in an open position. The embodiment shows a recess 502 in which the trough 430 may be inserted and removed. The recess 502 has retention flanges 504 that are designed to prevent substantial vertical and rotational movement of the trough 430 within the recess 502. The recess 502 has a slot 506 at the end of the recess 502 opposite the door 114. The slot 506 is designed to mate with a protrusion in the trough 430 in a snap-fit manner. The snap-fit mating of the slot 506 and the recess in the trough 430 is designed to restrict horizontal movement of the trough 430 within the recess 502.

Figure 6:
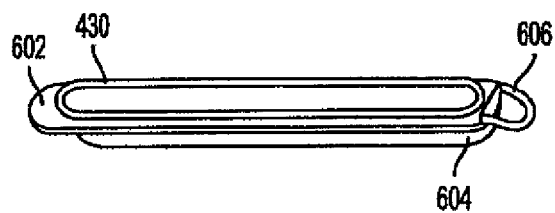
FIG. 6 is an isometric view of the trough removed from the apparatus.

FIG. 6 is an isometric view of the trough 430. The trough 430 includes an extension that includes a protrusion 602. The protrusion 602 is designed to mate with the slot 506 in a snap-fit manner. The embodiment shown in FIG. 6 includes flanges 604 that, as described with reference to FIG. 5, are designed to engage with the retention flanges 504. The embodiment shown in FIG. 6 also includes a handle 606. The handle is included to facilitate removal and insertion of the trough 430.

Figure 7:
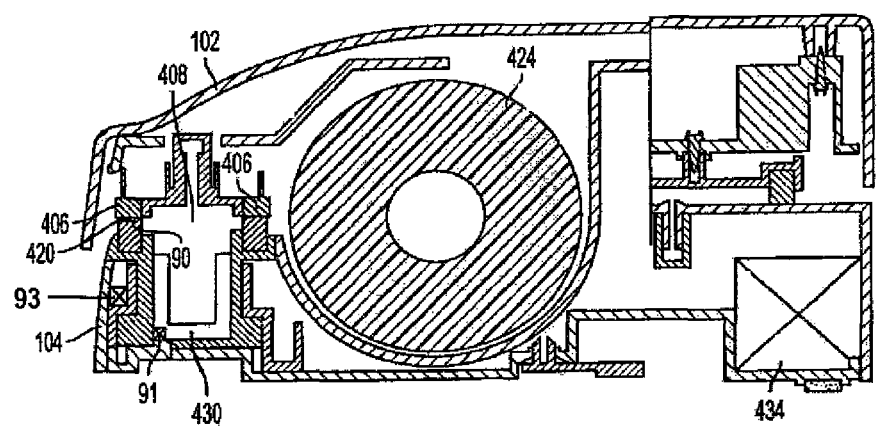
FIG. 7 is transverse cross-sectional view of the device shown in FIG. 1.

FIG. 7 is a sectional view of the apparatus shown in FIG. 1, cut along the section line A-A. FIG. 7 shows the lid 102 in a closed position relative to the base 104. The base 104 includes the thermal sealing mechanism that is positioned in substantial vertical alignment with the sealing gasket 406 in the lid 102 of the appliance. When the lid 102 is in a closed position relative to the base 104, the gasket 406 that surrounds the primary evacuation chamber 408 and the trough 430 are in substantial vertical alignment and are in contact, thus defining an evacuation chamber. The embodiment shown in FIG. 7 also shows a roll of container material 424 that is stored within the appliance 100, and a vacuum pump 434.

The embodiment of FIG. 7 shows the thermal sealing mechanism comprising a heat sealing element 420 mounted adjacent to the trough 430. In operation, the element 420 receives electrical current from a power source or sources that causes the element to heat up to temperatures exceeding 130 degrees thereby heat sealing the vacuum bag. As the location of the heat sealing element 420 is behind the gasket 406, this results in a seal that is close to the bag edge which results in the minimization of bag material necessary for packaging. Sensor 90 is a temperature sensor and is located adjacent to the sealing elements 420. Sensor 91 is a liquid sensor that senses the amount and presence of liquid in the trough 430. Both of these sensors feed signals back to a controller as shown in FIG. 9, that supplies power via control signals to the heat sealing elements 420. The present invention is described as a piston-type vacuum, however the vacuum source 434 may be any convenient mechanism capable of drawing a vacuum.

Figure 8:
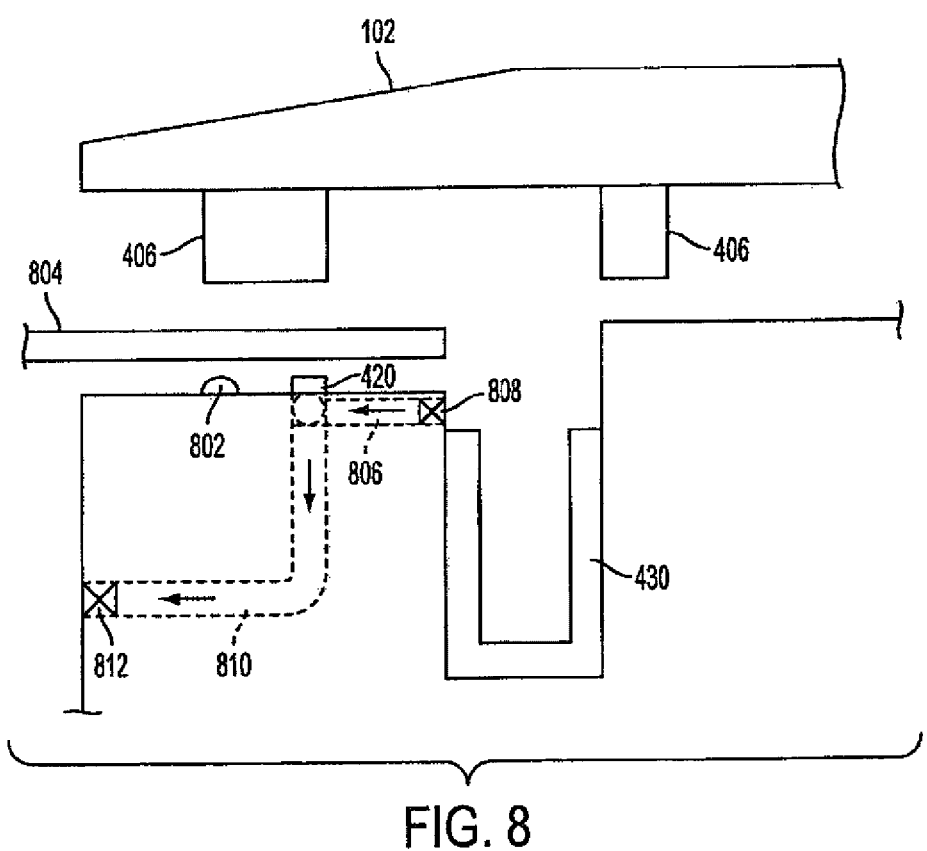
FIG. 8 is another embodiment of a transverse cross-sectional view of the device shown in FIG. 1.

FIG. 8 shows a vacuum sealable container 804 being placed into the appliance. In this embodiment the front side of the trough 430 includes the heat sealing elements 420 and an extension that includes a protrusion 802. The protrusion 802 is designed to seal the evacuation chamber and trough with the gasket 406. This view of the appliance shows the vacuum chamber 430 and lid 102 in an open position. A vacuum packaging bag 804 that is designed to be heat sealed by elements 420 is placed into the front of the appliance by the user. The gasket 406 is one continuous loop around the rectangular trough and vacuum chamber 430. The front side of gasket 406 is wider than the back side of the gasket. The gasket 406 is wider on the front side as the gasket 406 is performing multiple functions and this ensures that a proper vacuum seal is obtained.

As can be seen from FIG. 8, the gasket is used to create a seal but also to hold the vacuum packaging receptacle 804 in contact with the heat sealing elements 420 located adjacent to the trough 430. The presence of the bag 804 also requires a wider gasket 406 to ensure a proper seal. The back side of the gasket 406 does not perform multiple functions as the front side does, therefore it may be smaller in width. The gasket 406 is also only located on the lid 102 of the appliance. In this embodiment there is no need for an additional gasket mounted around the trough in the base of the appliance. This is another feature and advantage of the present invention.

Also shown in FIG. 8 are valves 808 and 812 and passages 806 and 810. The valve 808 is electrically controlled (by a controller as shown in FIG. 9) and is used to open and close an opening into a passageway 806. When the valve 808 is opened, the exhaust from the vacuum pump is directed through the passage 806. The passage runs underneath the entire length of the heating elements 420. The exhaust moving through the passage provides a cooling effect to reduce the temperature of the elements 420. After the exhaust has passed through the passage 806 and cooled the elements, the exhaust travels through an exit passage 810 and an exit valve 812.

Figure 19:
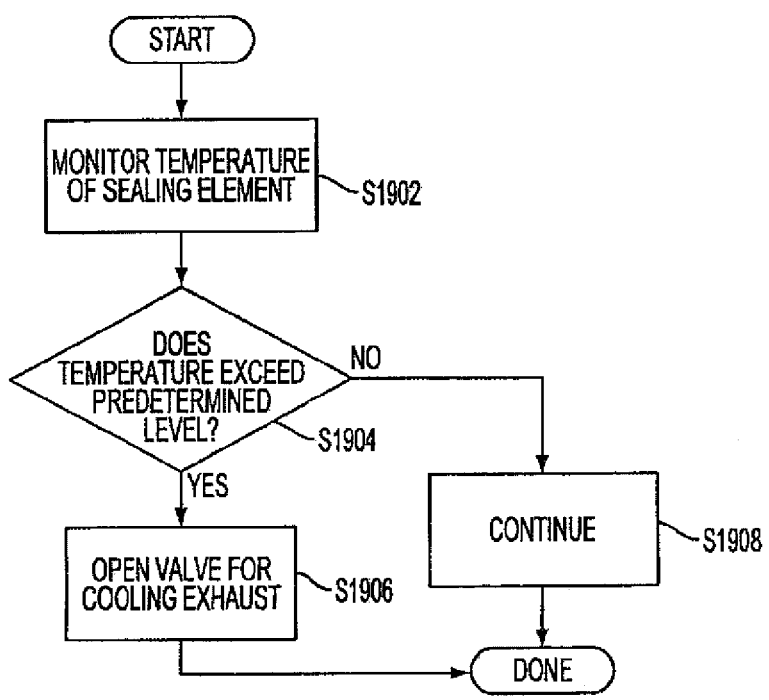
FIG. 19 is a flowchart showing method steps of the present invention.

The opening of the valve 808 is controlled by a signal from a heat sealing element controller that receives a temperature sensor input. The valve 808 is opened by the controller in response to a predetermined temperature of the heat sealing elements being exceeded. For example, if the heat-sealing layer of the vacuum packaging bag melts at 130 degrees, the predetermined temperature may be set at 120 degrees. This ensures that the heat sealing elements 420 stay below a melting temperature, so as to not prematurely produce a heat seal while the vacuum packaging bag is being evacuated. The controller may also open and close the valve 808 as necessary, in order to keep the heat sealing elements at a constant predetermined temperature or within some range below the predetermined temperature. A flowchart of the steps in this process is shown in FIG. 19.

Figure 8A:
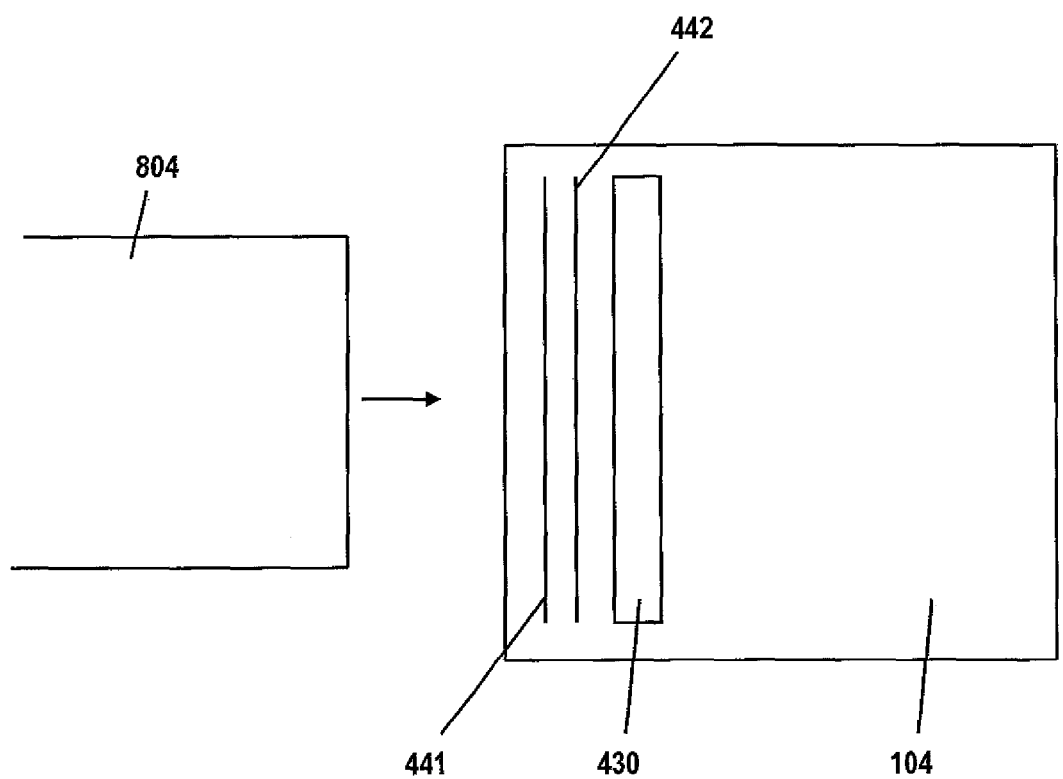
FIG. 8A is another embodiment of the heat sealing element wires.

FIG. 8A shows an embodiment of the present invention wherein the vacuum packaging appliance has two heat sealing elements. FIG. 8A shows a view looking at the base of the appliance 104 from above, as a vacuum bag 804 is placed in to the appliance and into the trough 430. In this embodiment the heat sealing elements are comprised of two separate wires, 441 and 442. Each wire when actuated with a current signal from a controller, becomes hot enough to melt the sealing layer of the vacuum packaging receptacle 804. As will be described below with reference to FIGS. 9 and 13-18, these two heat sealing element wires 441 and 442 are individually controlled to allow for precise temperature control based on a number of predetermined settings and/or predetermined conditions. For example, heavy seals are created by energizing both wires, while lighter seals are produced energizing only one of the two wires 441 or 442, wherein the heavy and light seals may be desired for a variety of reasons as described below.

A schematic diagram of the control circuitry of the heat sealing element of the above embodiments of the appliance 100 and 150 is shown in FIG. 9. Included is the temperature sensor 90 that feeds a real-time temperature signal TC1 of the heating elements back to the controller 92. Also included is a temperature sensor 93 that feeds a real-time temperature signal TC2 of the base 104 (FIG. 1) or 155 (FIG. 1A) in the proximity of the heating element 420 back to a controller 92. The controller 92 is an application specific integrated circuit or (ASIC) device. The controller 92 may also be a programmable logic device (PLD) or any other type of microprocessing device capable of being programmed to control the functions of the vacuum packaging appliance as described herein.

As mentioned above, problems with overheating and faulty sealing result from inaccurate temperature control of the heat sealing elements 420. The sensor 90 allows the controller 92 to supply more or less electrical power to the elements based on this temperature. For example, in the vacuum sealing appliance 100 a standard heavy seal would be to supply current to the elements for a predetermined period of 5 seconds creating an optimal pre-determined vacuum bag temperature of 130 degrees (54° C.) (required to melt the interior heat sealing layer). If the present heat sealing element temperature is already 110 degrees (43° C.), a heavy seal may be produced by only supplying current for a duration of 2 seconds. The total time T the indicator light 314 (FIG. 3) would flash intermittently green to indicate sealing would be for 5 seconds taking into account the amount of time TI of 2 seconds the current was on and a delay time D of 3 seconds. This process or algorithm thereby increases the power efficiency of the appliance and does not damage the heat sealing elements 420 by overheating them with a full 5 second duration heavy seal pulse.

Thus, as the sensor 90 senses that the heat sealing elements 420 are getting too hot, the actual sealing time TI (time the current to the heating elements 420 is on) is shortened and the dwell time D is increased. If the sensor 90 senses that the heating elements 420 are cooler, then the actual sealing time TI is increased and the dwell time D is shortened. In the alternate embodiment vacuum sealing appliance 150 it has been found that varying the actual sealing time TI and dwell time D in this manner significantly increases the number of repetitive sealing cycles (greater than 25) that may be performed without the vacuum packaging appliance 150 overheating. A sealing operation cycle begins when the single seal button 370 is depressed. A vacuum and sealing operation begins when the vacuum and seal button 372 is depressed. The vacuum portion of the sealing operation cycle is described above in the embodiment of the vacuum and sealing appliance 100 and is substantially identical in operation in the alternate embodiment appliance 150.

As the vacuum and sealing operation cycle continues progress indicator lights 381-385 are energized indicating various stages of progress of the vacuum portion of the vacuum and sealing operation cycle. For example, in the illustrated embodiment there are five progress indicator lights 381-385 which are lighted in succession during five corresponding portions of the vacuum portion of the vacuum and sealing operation cycle described below. The progress indicator light 381 is lighted during the first twenty percent portion of the vacuum operation cycle, the progress indicator light 382 is lighted during the second twenty percent portion, etc. There could be many possible numbers and/or configurations of progress indicator lights and portions of the vacuum operations of the vacuum and sealing operation cycle are divided into so the above example is not meant to be limiting.

The plurality of progress indicator lights 381-385 emit a solid green light when energized but could emit any other color light including red or amber.

The sealing portion of the both the sealing operation cycle and the vacuum and sealing operation cycle includes both the time TI the current was being supplied to the heater elements 420 and the dwell time D after the current was shut off. Seal indicator light 386 is also energized and lighted when the sealing operation is being performed and is not extinguished until the sealing operations are completed. The seal indicator light 386 emits a red color light when energized but could emit any other color including green or amber.

Examples of seal timings or the total time T for sealing (current on time TI+dwell time D) that have been found to be advantageous for the vacuum sealing appliance 150 according to the real-time heat sealing element temperature TC1 of the heat sealing elements 420 for both AC power and DC power sources may be stored in look-up tables such as Tables A and B below:

TABLE A

| AC Power Source |
| --- |
| TC1 ≤ 40° C., TI = 9 seconds, D = 3 seconds |
| 40° C. < TC1 ≤ 45° C., TI = 8 seconds, D = 4 seconds |
| 45° C. < TC1 ≤ 50° C., TI = 7 seconds, D = 5 seconds |
| 50° C. < TC1 ≤ 55° C., TI = 6 seconds, D = 6 seconds |
| TC1 > 55° C., TI = 5 seconds, D = 7 seconds |

TABLE B

| DC Power Source |
| --- |
| TC1 ≤ 30° C., TI = 20 seconds, D = 3 seconds |
| 30° C. < TC1 ≤ 45° C., TI = 18 seconds, D = 5 seconds |
| 45° C. < TC1 ≤ 50° C., TI = 8 seconds, D = 7 seconds |
| TC1 > 50° C., TI = 5 seconds, D = 7 seconds. |

Note that the time TI the current being supplied to the heater elements 420 is longer in Table B for a DC power source since the amplitude of the current from a DC power source is typically less than that which can be provided by an AC power source. Alternately, the above values may be computed using an algorithm known to one of ordinary skill in the art in order to energize the heating elements 420 to an optimum predetermined sealing temperature.

The controller 92 may prevent the above vacuum and sealing operations in the vacuum sealing appliance 150 if the sensor 93 detects that the temperature TC2 of the base 155 exceeds 65° C. or the temperature TC1 exceeds 75° C. If either of these conditions is met, the controller 92 will flash the seal indicator light 386 red and disable all operational controls including the single seal button 370 and the seal and vacuum button 372 until the temperature TC2 is below 65° C. and the temperature TC1 is below 75° C.

In addition to changing the pulse duration, the controller may also change the amplitude of the pulse or change both amplitude and duration if desired. When controlling actuation pulses to the two elements as shown in FIG. 8A, the controller 92 may actuate only one of the wires 441 or 442 based on temperature conditions as described above. For example, if the elements are already warm, only one element 441 is energized. If the elements are cool, both wires 441 and 442 are actuated by the controller 92.

Figure 15:
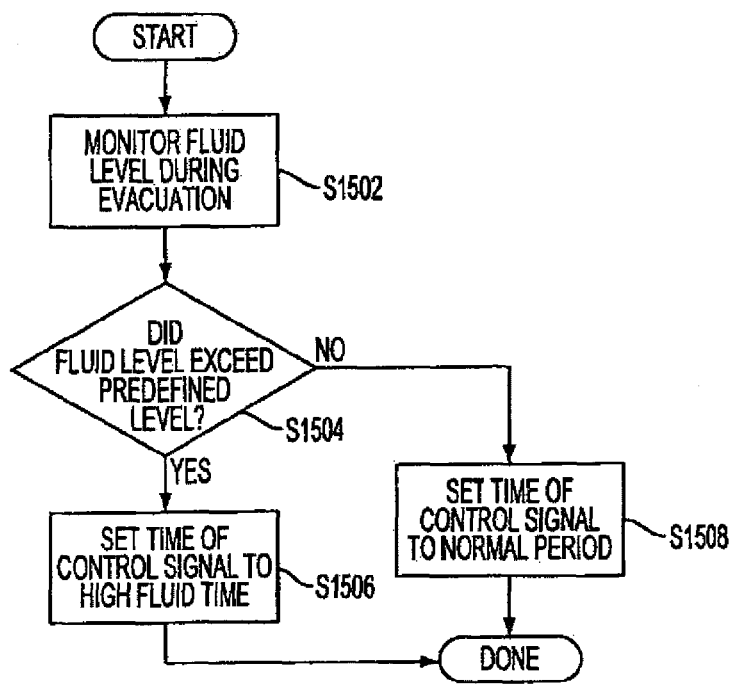
FIG. 15 is a flowchart showing method steps of the present invention.

The liquid sensor 91 feeds a signal back to the controller 92 indicating the presence or amount of liquid in the trough 430. This is important as the presence of liquids may require higher sealing temperatures of the elements 420, as liquids tend to reduce the effects of the heat sealing elements. Therefore the controller 92 would produce a heat seal activation signal of greater duration when liquids are present, or send sealing actuation pulses to both sealing elements 441 and 442 as shown in FIG. 8A. FIG. 15 shows this process in detail. Regarding the details of the liquid sensor, patent application with Ser. No. 60/492,046, entitled "Fluid Sensing in a Drip Tray", by inventors Charles Wade Albritton, Landon Higer and John Peters, which is hereby incorporated by reference.

Figure 10:
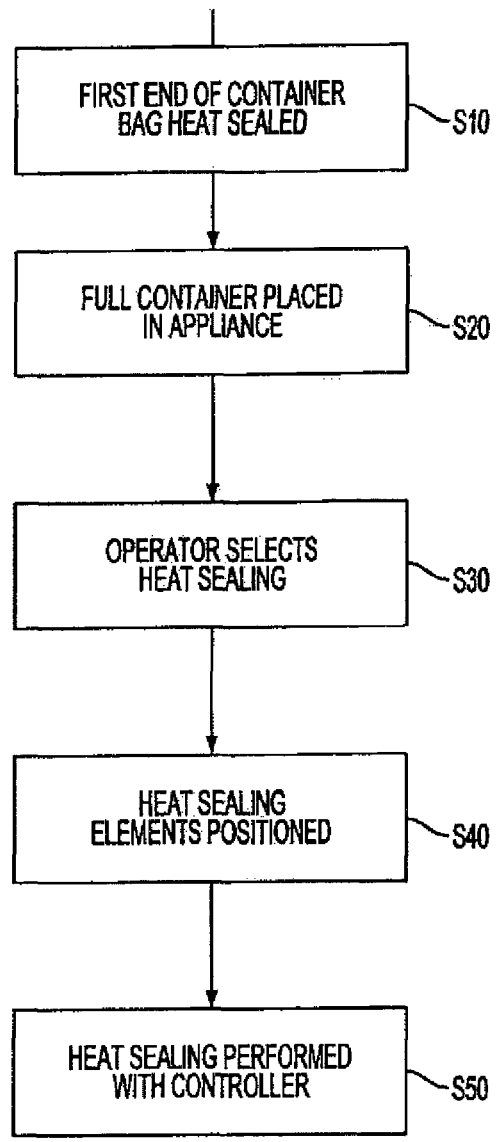
FIG. 10 is a flowchart showing method steps of the present invention.

FIG. 10 shows a method of controlling the vacuum packaging device. In step S10 the process is begun when the operator seals a first end of the container bags. It may be desired to seal a first and second end of the vacuum bags in the exact same manner by the operator. Sealing both ends of the bag in the same manner ensures an ease of operation that results in less operator errors and thereby decreases the wasted bag material. After a first end of the bag has been sealed the operator places items to be packaged into the bag. The bag that is ready for sealing is then placed into the device for evacuating and heat sealing the second end of the container in step S20. In step S30 the operator selects the appropriate type of seal. In step S40 the heat sealing element may be moved into position by closing the lid of the device itself. In step S50 the heat sealing controller instigates the chosen type of seal by controlling the current to the sealing element or elements. As described above, the heat sealing process is controlled by the controller 92 in accordance with the inputs from multiple sensors and internal logic and programming. The process is then finished in step S60.

Figure 11:
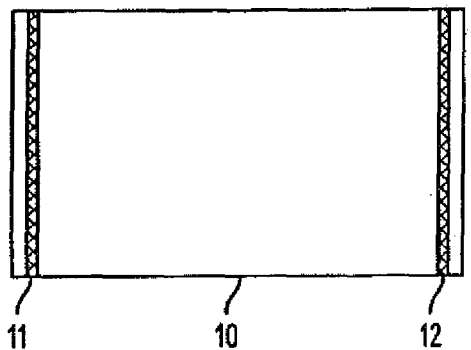
FIG. 11 shows a vacuum sealed bag in accordance with the present invention.
Figure 12:
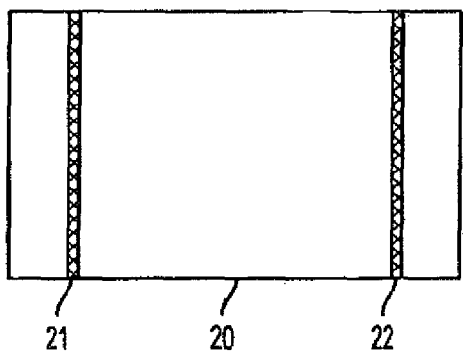
FIG. 12 shows a Prior Art vacuum sealed bag.

The sealed bag of the present invention is shown in FIG. 11. The vacuum sealed container 10 has heat seals 11 and 12 after being processed by the vacuum packaging appliance. The length of bag material between the ends and the heat seals 11 and 12 is minimized. By incorporating the heat sealing element adjacent to the trough, the seal may be placed closer to the container end, thereby resulting in less bag waste. This is a substantial improvement over prior art bags as shown in FIG. 12. FIG. 12 shows heat seals 21 and 22 that are far from the bag ends resulting in substantial waste and cost to the user.

Figure 13:
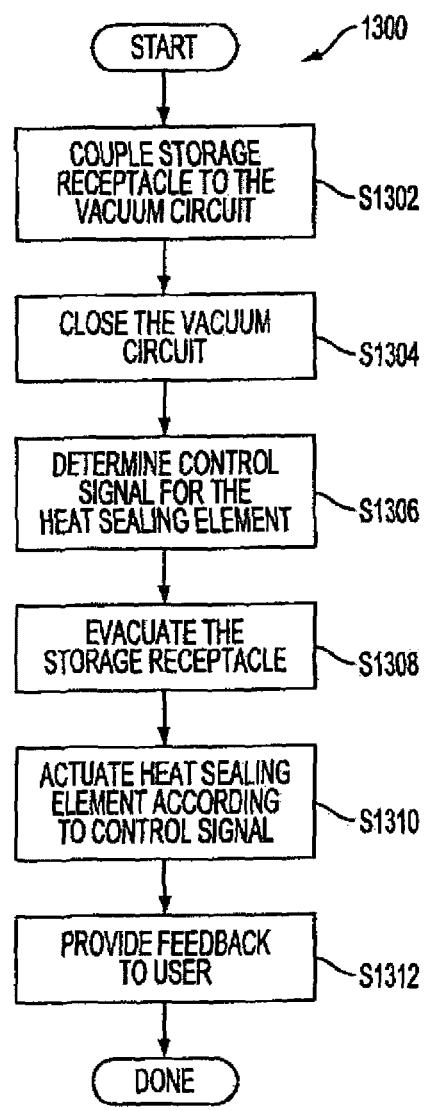
FIG. 13 is a flowchart showing method steps of the present invention.

FIG. 13 shows a method 1300 of controlling the vacuum packaging device. In step S1302 the process begins when the operator couples the storage receptacle to the vacuum circuit by placing the container into the vacuum packaging appliance. In step S1304, the vacuum circuit is closed when the operator closes the lid of the device. In step S1306 the type of heat seal is determined. As is described below and as shown in FIGS. 14-18, this step may contain inputs from a variety of parameters in order to determine the exact nature of the control signal applied to the heat sealing elements. In step S1308 the container is evacuated and is ready for sealing. In step S1310 the heat sealing element is actuated according to the determined control signal. This step may include determining if one or both wires 441 and 442 (as shown in FIG. 8A) are to be actuated. In step S1312 feedback of the heat sealing process is provided to the user. For example lights on the control panel may indicate that sealing is being performed and/or that the heat sealing process is complete. As shown in FIG. 9, the heat sealing controller determines and actuates the current provided to the heat sealing element. As described above, the heat sealing process is controlled by the controller 92 in accordance with the inputs from multiple sensors and internal logic and programming.

Figure 14:
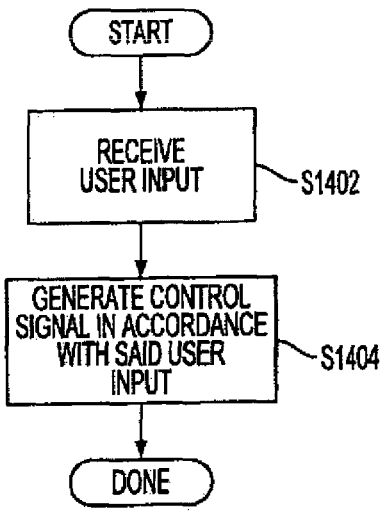
FIG. 14 is a flowchart showing method steps of the present invention.

FIG. 14 shows in more detail how the control signal is determined in step S1310 above. The process begins in step S1402 by receiving the user input regarding the type of heat seal selected. This input comes from the control panel shown in FIG. 3 and described above. In step S1404 the proper control signal is determined by the controller 92. In this manner the time of the control signal to the heat sealing elements is input. As will be described below, the control signal set by the operator may change in accordance with the amount of liquid sensed in the trough and/or the temperature of the heating elements.

FIG. 15 shows in more detail how the control signal may be adjusted in step S1310 above. The process begins in step S1502 by monitoring the presence and amount of liquid in the trough during the evacuation process in step S1308. The liquid sensing electrodes as shown in FIG. 7 provide this information to the controller circuit 92. In step S1504 it is determined by the controller if a predetermined threshold of liquid has been exceeded. If the liquid is below a certain level, step S1508 is enacted and the time of the control signal to the heat sealing elements is set to a normal period (as set by the operator). If it has been determined in step S1504 that a predetermined amount of liquid is present, step S1506 adjusts the set time of the control signal to the elements to be high or energizes both heat sealing wires 441 and 442 as shown in FIG. 8A. By incorporating the liquid sensing electrodes into the trough of the appliance, the heat seal may be controlled in a more precise manner, thereby resulting in less bag waste. This is a substantial improvement over prior art devices that are incapable of monitoring and adjusting the heat sealing process in accordance with the amount of liquid detected during the evacuation process.

Figure 16:
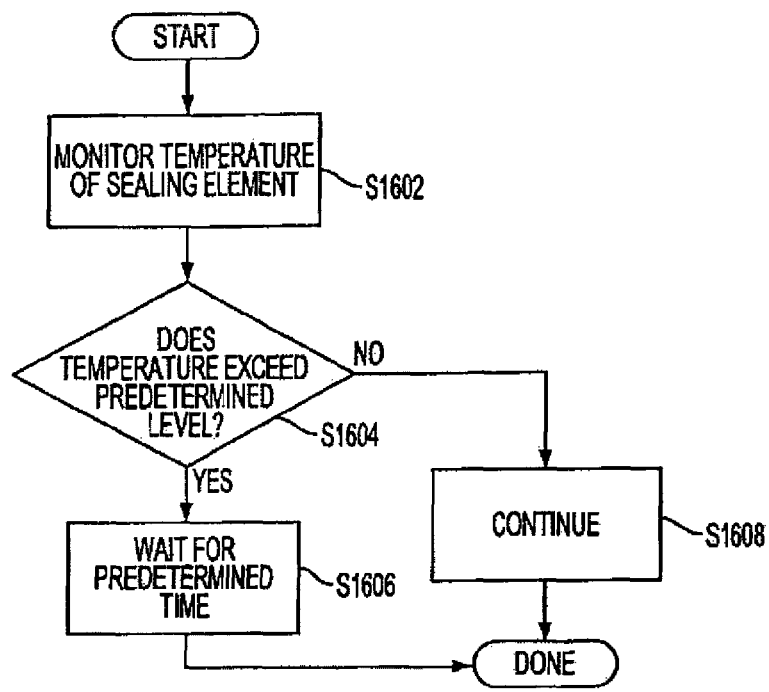
FIG. 16 is a flowchart showing method steps of the present invention.

FIG. 16 also shows in detail how the control signal is determined in step S1310 above. The process begins in step S1602 by monitoring the present temperature of the heat sealing elements. The temperature sensor as shown in FIG. 7 provides this information to the controller circuit 92. In step S1604 the controller determines if a predetermined threshold of temperature has been exceeded. If the temperature is below a certain level, step S1608 is enacted and the vacuum packaging appliance continues with the evacuating and heat sealing operations in a normal manner. If it has been determined in step S1604 that a predetermined temperature has been exceeded, step S1606 waits or suspends operations for a predetermined period of time until the heat sealing elements have cooled.

By incorporating the temperature sensor adjacent to the trough of the appliance, the heat seal may be controlled in a more precise manner, thereby resulting in less bag waste. This is a substantial improvement over prior art devices that are incapable of monitoring and adjusting the heat sealing process in accordance with a plurality of sensor inputs and control modes.

Figure 17:
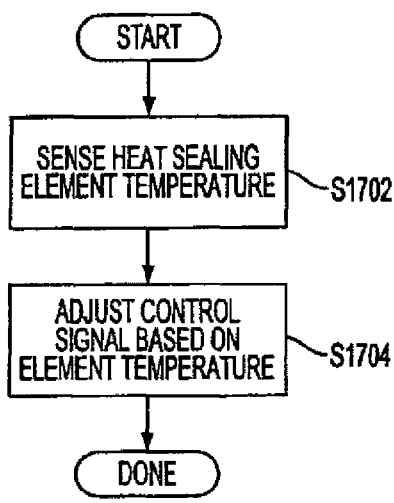
FIG. 17 is a flowchart showing method steps of the present invention.

In addition to suspending the heat sealing operations as described above, the present invention is also capable of adjusting the control signal times based on the temperature of the elements. FIG. 17 shows a flowchart of steps 1700 enacted by the controller 92. The controller 92 stores control signal times for all the heat seal settings from which the operator may select. A light or heavy seal control signal time duration may also be increased or decreased based on the real-time feedback of the temperature of the heat sealing elements. The controller 92 may therefore be programmed to keep the heat sealing elements at a constant temperature while sealing or within a predetermined temperature range while sealing.

The process begins in step S1702 when the temperature of the heat sealing elements is detected and sent to the controller. In step S1704 the controller adjusts the duration of the control signal applied to the heat sealing elements based on their real-time detected temperature. As per the algorithm mentioned above, more or less current may be applied to the elements based on their sensed temperature. For example a warm heating element may require 3 seconds of current to produce a seal, whereas a cold heat sealing element may require 5 seconds of current to produce a similar heat seal. In addition to varying the activation signal duration, other embodiments may adjust the amplitude and/or duration of the control signal in a real-time manner as applied to each individual sealing wire 441 and 442 as shown in FIG. 8A. Step S1704 may also include waiting for the heat sealing elements to cool down.

The algorithm enacted by controller 92 can also adjust waiting times for cooling periods. For example a wait time of 20 seconds may be required for a hot element at 150 degrees to cool down to 100 degrees, and a wait time of 10 seconds may be required for an element at 135 degrees to cool to 100 degrees. It is also contemplated that the algorithm can maintain the element temperature at some constant temperature during the sealing process.

Figure 18:
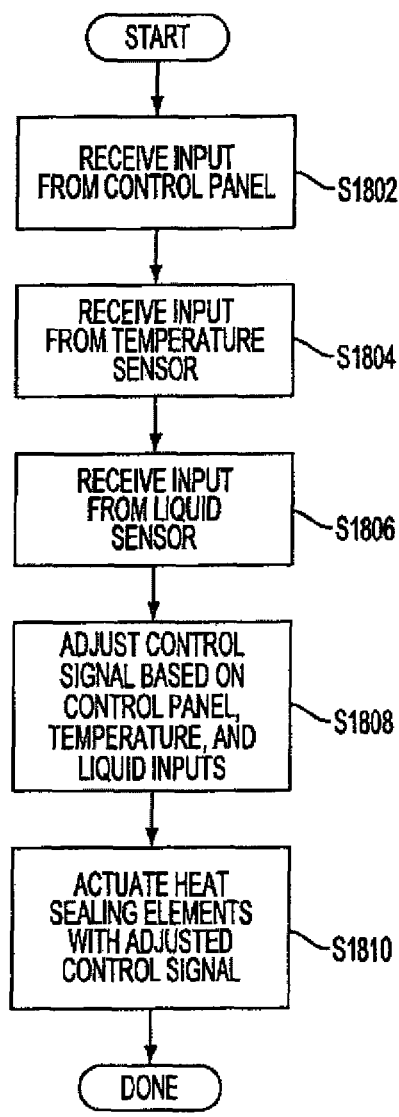
FIG. 18 is a flowchart showing method steps of the present invention.

FIG. 18 shows another method of the present invention. In this method the controller 92 adjusts the control signal provided to the elements based on inputs from the control panel, the temperature of the heat sealing elements, and the amount of liquid sensed in the trough. The process begins in step S1802 by receiving the user selected type of heat seal. In step S1804 the controller receives information regarding the temperature of the heat sealing elements from the temperature sensor 90. In step S1806 the controller receives information regarding the amount of liquid in the trough from the liquid sensor 91. In step S1808 the controller takes into account all the information described above and adjusts the control signal based on the selected seal setting, the temperature of the elements and the amount of liquid in the trough. The appropriate control signal is then sent from the controller to actuate the sealing elements in step S1810.

For example, the operator may select a medium heat seal which would have a control signal duration of 4 seconds. If the temperature of the heat sealing elements was detected to be 110 degrees, 0.5 seconds of time duration may be subtracted from the control signal, as the heat sealing elements are already warm. If a substantial amount of liquid is detected by the liquid sensors, the controller may add 1.0 second of time to the duration of the control signal. This results in an appropriate control signal duration of 4.5 seconds to be applied to the heat sealing elements. The controller 92 may use an algorithm or look-up table such as Tables A and B to determine these adjusted control signal periods based on these pertinent parameters.

In another embodiment, the process as shown in FIG. 18 is also applied to the heat sealing wires as shown in FIG. 8A. In this environment, the controller 92 adjusts the control signal (in an on/off manner) provided to the plurality of elements based on inputs from the control panel, the temperature of the heat sealing elements, and the amount of liquid sensed in the trough. For example, when the elements are detected to be hot (a predetermined temperature has been exceeded) as sensed by the temperature sensor, only one of the two wires may be energized. When liquids are detected, both wires 441 and 442 are activated to ensure that the presence of liquid does not effect the heat seal. The operator may also select a "light" or "heavy" seal by using the control panel switches. In this instance a "light" seal would activate only one wire, while a "heavy" seal would activate both wires.

FIG. 19 shows a flowchart of steps in another embodiment of the present invention. The process begins in step S1902 by monitoring the present temperature of the heat sealing elements as the vacuum packaging appliance is evacuating a receptacle. The temperature sensor as shown in FIG. 7 provides this information to the controller circuit 92. In step S1904 the controller determines if a predetermined threshold of temperature has been exceeded. If the temperature is below a certain level, step S1908 is enacted and the vacuum packaging appliance continues with the evacuating and heat sealing operations in a normal manner.

If it has been determined in step S1904 that a predetermined temperature has been exceeded, step S1906 is enacted wherein the controller produces a signal that opens a valve which enables the vacuum pump exhaust to be blown under the heat sealing elements in order to cool the elements. This process provides real-time feedback and control of the heat sealing elements temperature. This process reduces the amount of faulty seals that occur when the elements are warm from previous use and begin to prematurely melt the heat sealing layer within the vacuum packaging bags before they are completely evacuated. This process also ensures that the heat sealing elements maintain an acceptable temperature range so that they may be subsequently controlled by the controller using the methods described above.

Figure 20:
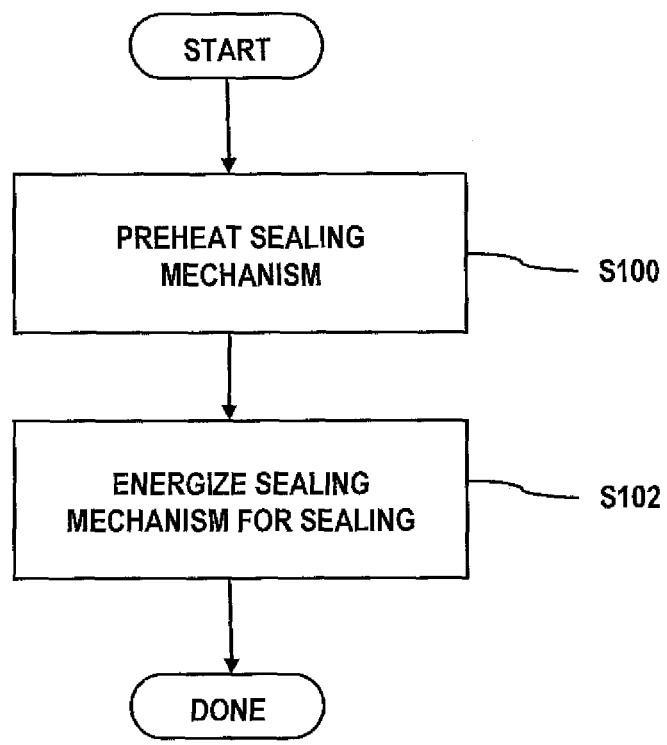
FIG. 20 is a flowchart showing method steps of the present invention.

FIG. 20 illustrates a preheat method according to another embodiment of the present invention. This method is well suited to particularly thick vacuum packaging receptacles and vacuum packaging receptacles that have large ridges or patterns thereon. A step S100 begins by energizing a sealing mechanism to a preheat level. The preheat step S100 is typically done in conjunction with an evacuation step, rendering the receptacle ready for easy and prompt sealing. The preheat step S100 could raise the sealing mechanism temperature to any suitable level, for example somewhat lower than the actual sealing temperature. This prepares the receptacle for actual sealing, but does not initiate, substantial sealing that tends to interfere with evacuation. A step S102 completes the sealing process by fully energizing the heat sealing mechanism.

Figure 21:
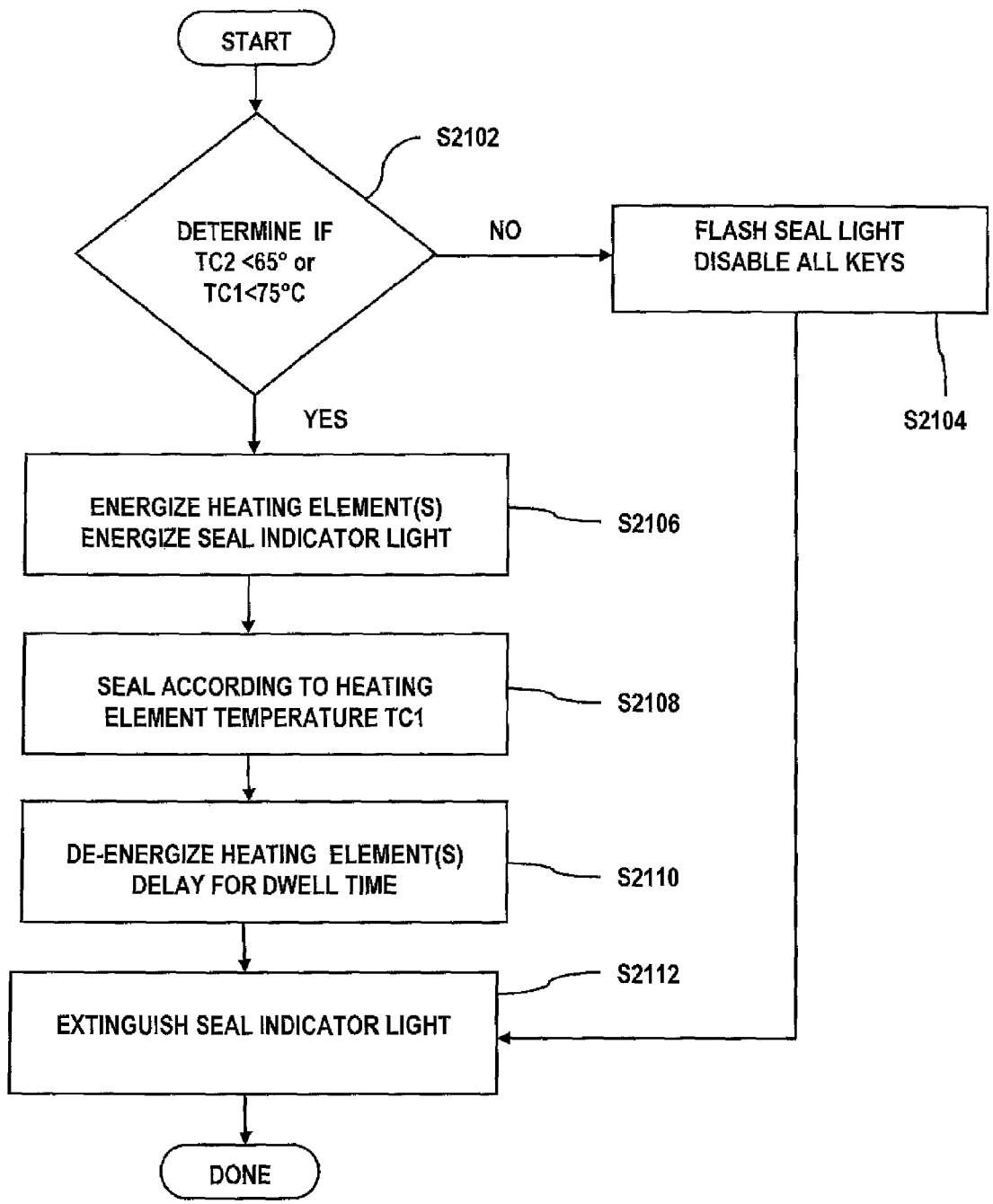
FIG. 21 is a flowchart showing method steps of the present invention.

FIG. 21 shows in more detail how the control signal may be adjusted in step S1310 above in the sealing operations of the vacuum sealing appliance 150. In step S2102, it is determined whether the temperature TC2 of the base 155 as measured by sensor 93 is less than 65° C. or if the temperature TC1 of the heating elements 420 is less than 75° C. If both of these conditions are not satisfied, in step S2104 the controller 92 flashes the seal indicator light 386 red and disables all operational controls including the single seal button 370 and the seal and vacuum button 372 until these conditions are met. If both of these conditions are met, then the controller 92 may energize the heating elements 420 and the seal indicator light 386.

In step S2108, the container 20 is sealed by energizing the heater elements 420 for a length of time TI according to the real-time temperature TC1 of the heater elements 420. For example, if the real-time temperature TC1 of the heat sealing elements 420 was detected to be less than or equal to 40° C. (104° F.), the heater elements 420 would be energized for a time TI of 9 seconds. The time TI that the heater elements 420 is energized for a given real-time temperature TC1 may be derived from an algorithm or stored as values retrieved from a look-up table such as tables A and B above. After the time TI of 9 seconds has elapsed, in step S2110 the controller 92 de-energizes the heater elements 420 and initiates a dwell time D of 3 seconds that corresponds to the time TI. The dwell time D may be derived from an algorithm or may be values retrieved in look-up tables such as Tables A and B above along with the corresponding heater elements 420 temperature TC1. After the dwell time D has passed, in step S2112 the controller 92 extinguishes the seal indicator light 386. Another vacuum and sealing operation cycle or sealing operation cycle, if desired, may then be initiated. Without the dwell time D after the sealing operation, the heater elements 420 may be too hot to allow another container 20 to be inserted into the appliance 150 in a subsequent sealing operation cycle. The dwell time D ensures the heater elements 420 have cooled sufficiently to allow another container 20 to be inserted in to the appliance 150.

The appliances described above show the heat sealing mechanism external to the vacuum chamber. However, the teaching of the present invention works equally well with appliances having the heat sealing mechanism internal to the vacuum chamber. One suitable example of this is commonly assigned U.S. provisional patent application 60/492,090, filed Jul. 31, 2003, and incorporated herein by reference. Additionally, the appliances described illustrate the receptacle external to the vacuum chamber. As will be appreciated, the teachings of the present invention work well with in-chamber vacuum packaging appliances.

The vacuum packaging device described herein therefore provides numerous embodiments and methods to cool the heat sealing elements and embodiments and methods to control and energize the heat sealing elements that may be used in combination or separately as desired. It will be understood by those skilled in the art that the above-presented description is provided by way of example only and is not intended to be limiting in anyway. Those skilled in the art will readily understand that numerous other embodiments of the invention are contemplated and possible which meet the scope and spirit of the invention.

All references cited herein are expressly incorporated by reference in their entirety.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method of controlling a sealing appliance, comprising:
sensing with a first sensor a first temperature of at least one heat sealing element of the sealing appliance;
dynamically determining with a programmable logic device first values for a variable sealing time and a variable dwell time based on a first sensed value for the first temperature, where the variable sealing time comprises a first amount of time needed to energize and heat the heat sealing element to a pre-determined temperature tier sealing a container and the variable dwell time comprises a second amount of time needed to cool the heat sealing element after sealing the container;
providing an actuation control signal to the heat sealing element for a time duration specified by the first value previously determined for the variable sealing time; and
extinguishing a seal indicator light subsequent to expiration of the variable sealing time and the variable dwell time;
wherein a plurality of values for the first temperature of the heat sealing element and a plurality of values for the variable sealing time and the variable dwell time that correspond to the plurality of values for the first temperature are stored in a look-up table accessed by the programmable logic device.

2. The method of claim 1, wherein the look-up table corresponds to values of temperatures, sealing times and dwell times for an alternating current power source.

3. The method of claim 1, wherein the look-up table corresponds to values of initial temperatures, sealing times and dwell times for a direct current power source.

4. The method of claim 1, further comprising evacuating a container placed into the sealing appliance.

5. The method of claim 1, further comprising commencing a sealing operation cycle when a seal button is depressed.

6. The method of claim 1, further comprising commencing a vacuum and sealing operation cycle when a seal and vacuum button is depressed.

7. The method of claim 1, further comprising lighting a ready indicator light after the seal indicator light has been extinguished.

8. The method according to claim 1, further comprising dynamically adjusting the variable sealing time and the variable dwell time based on a second sensed value for the first temperature.

9. The method according to claim 1, further comprising sensing at least one of a presence of liquid in a trough of the sealing appliance and an amount of liquid in the trough.

10. The method according to claim 9, further comprising dynamically adjusting at least the variable sealing time based on at least one the presence of the liquid in the trough and the amount of the liquid in the trough.

11. The method according to claim 1, further comprising:
using first and second portions of a gasket for creating a vacuum seal; and
using the second portion of the gasket to additionally hold a vacuum packaging receptacle in contact with the heat sealing element located adjacent to a trough of the sealing appliance;
wherein the first portion of the gasket has a first width smaller than a second width of the second portion of the gasket.

12. A method of controlling a sealing appliance, comprising:
sensing with a first sensor a first temperature of at least one heat sealing element of the sealing appliance;
sensing with a second sensor a second temperature of a base of the sealing appliance;
determining with a programmable logic device whether the first temperature of the at least one heat sealing element is below a first threshold temperature and whether the second temperature of the base is below a second threshold temperature;
disabling all vacuum and sealing operation keys if both the first temperature of the at least one heat sealing element is not below the first threshold temperature and the second temperature of the base is not below a second threshold temperature and flashing a seal indicator light;
initiating a sealing operation cycle if both the first temperature of the at least one heat sealing element is below the first threshold temperature and the second temperature of the base is below a second threshold temperature and lighting the seal indicator light, the sealing operation cycle including:
dynamically determining first values for a variable sealing time and a variable dwell dine based on a first sensed value for the first temperature of the heat sealing element, where the variable sealing time comprises a first amount of time needed to energize and heat the heat sealing element to a pre-determined temperature for sealing a container and the dwell time comprises a second amount of time needed to cool the heat sealing element after sealing the container; and
extinguishing the seal indicator light subsequent to the expiration of the variable sealing time and the variable dwell time;
wherein values of the first temperatures of the heat sealing element and values of the variable sealing times and the variable dwell times that correspond to the values of the first temperatures are stored in a look-up table accessed by the programmable logic device.

13. The method of claim 12, further comprising selecting the first threshold temperature to be 75° C.

14. The method of claim 12, further comprising selecting the second threshold temperature to be 65° C.

15. The method of claim 12, further comprising lighting a ready indicator light after the sealing operation has been completed and the seal indicator light has been extinguished.

16. The method of claim 15, wherein the ready indicator light is green when lighted.

17. The method of claim 12, further comprising commencing a sealing operation cycle when a seal button is depressed.

18. The method of claim 12, further comprising commencing a vacuum and sealing operation cycle when a seal and vacuum button is depressed.

19. The method of claim 12, wherein the seal indicator light flashes red when the vacuum and sealing operation keys are disabled if both the first temperature of the heat sealing element is not below the first threshold temperature and the second temperature of the base is not below a second threshold temperature.

20. The method of claim 12, wherein the look-up table corresponds to values of first temperatures, sealing times and dwell times for an alternating current power source.

21. The method of claim 12, wherein the look-up table corresponds to values of first temperatures, sealing times and dwell times for a direct current power source.

* * * * *